US012659632B2

(12) United States Patent　　(10) Patent No.:　US 12,659,632 B2
Matatyaou et al.　　　　　　　　　(45) **Date of Patent:　*Jun. 16, 2026**

(54) VIRTUAL ACCESS HUB

(71) Applicant: Harmonic, Inc., San Jose, CA (US)

(72) Inventors: Asaf Matatyaou, San Carlos, CA (US);
Nitin Sasi Kumar, San Ramon, CA
(US)

(73) Assignee: Harmonic, Inc., San Jose, CA (US)

( * ) Notice: Subject to any disclaimer, the term of this
patent is extended or adjusted under 35
U.S.C. 154(b) by 468 days.

This patent is subject to a terminal dis-
claimer.

(21) Appl. No.: 18/203,044

(22) Filed: May 29, 2023

(65) Prior Publication Data

US 2023/0353916 A1　　Nov. 2, 2023

Related U.S. Application Data

(63) Continuation-in-part of application No. 17/068,349,
filed on Oct. 12, 2020, now Pat. No. 11,665,012,
(Continued)

(51) Int. Cl.
*H04Q 11/00*　　　(2006.01)
*H04L 12/66*　　　(2006.01)
*H04L 45/302*　　　(2022.01)

(52) U.S. Cl.
CPC ......... *H04Q 11/0067* (2013.01); *H04L 12/66*
(2013.01); *H04L 45/302* (2013.01); *H04Q*
*2011/0081* (2013.01)

(58) Field of Classification Search
CPC ........ H04Q 11/0067; H04Q 2011/0081; H04L
12/66; H04L 45/302; H04L 12/12; H04L
41/0895; H04L 12/2801; G06F 9/45541
See application file for complete search history.

(56) References Cited

U.S. PATENT DOCUMENTS 9,292,673 B2 *　3/2016　Rutkowski .......... H04L 63/0428
9,882,833 B2 *　1/2018　McBride .............. H04L 47/762
(Continued)

FOREIGN PATENT DOCUMENTS

CA　　2475472 C　*　7/2017　............. H04L 41/50
CA　　3125970 A1　*　7/2020　........... H04L 67/289
(Continued)

OTHER PUBLICATIONS

Mayoral, Arturo; Multi-tenant 5G Network Slicing Architecture
with Dynamic Deployment of Virtualized Tenant Management and
Orchestration (MANO) Instances; Dec. 13, 2016 (Year: 2016).*
(Continued)

*Primary Examiner* — Ayaz R Sheikh
*Assistant Examiner* — Louis Samara
(74) *Attorney, Agent, or Firm* — Brokaw Patent Law, PC;
Christopher J. Brokaw

(57)　　　　　　ABSTRACT

A multi-tenant application that provides high speed data
services to one or more subscriber devices. High speed data
services may include one or more of Dynamic Host Con-
figuration Protocol (DHCP) services, software upgrade ser-
vices, and Profile Management Application (PMA) services.
The multi-tenant application comprises one or more first
servers that each perform packet switching and routing and
one or more second servers that each perform FCAPS
functions for the one or more subscriber devices. FCAPS
functions comprise fault operations, configuration opera-
tions, accounting operations, performance operations, and
security operations. Second servers may be implemented
entirely within an application-specific logical host com-
posed of one or more application containers and may
optionally each further perform network functions and user
plane functions for the one or more subscriber devices. The
one or more second servers may optionally each further
(Continued)

perform OLT control functions and OLT MAC/PHY functions for the one or more subscriber devices.

9 Claims, 13 Drawing Sheets

Related U.S. Application Data which is a continuation-in-part of application No. 16/054,979, filed on Aug. 3, 2018, now Pat. No. 10,802,856.

(60) Provisional application No. 62/544,550, filed on Aug. 11, 2017.

(56) References Cited

U.S. PATENT DOCUMENTS

| | | | | | |
|---|---|---|---|---|---|
| 11,212,159 | B2 * | 12/2021 | Fargano | ................. | H04L 49/354 |
| 2013/0054668 | A1 * | 2/2013 | Rajan | ...................... | H04L 67/60 |
| | | | | | 709/201 |
| 2014/0334485 | A1 * | 11/2014 | Jain | .................... | H04L 12/4633 |
| | | | | | 370/389 |
| 2015/0082301 | A1 * | 3/2015 | Garg | ................... | G06F 9/45533 |
| | | | | | 718/1 |
| 2015/0095960 | A1 * | 4/2015 | Hurst | ................... | H04N 17/004 |
| | | | | | 725/107 |
| 2015/0200838 | A1 * | 7/2015 | Nadeau | ................... | H04L 45/50 |
| | | | | | 370/254 |
| 2015/0270988 | A1 * | 9/2015 | Finkelstein | ......... | H04L 12/2898 |
| | | | | | 370/401 |
| 2018/0041905 | A1 * | 2/2018 | Ashrafi | .................... | H04L 67/10 |
| 2018/0167268 | A1 * | 6/2018 | Liguori | ................... | H04L 67/10 |
| 2018/0219769 | A1 * | 8/2018 | Uttaro | ................ | H04L 12/4633 |
| 2018/0316578 | A1 * | 11/2018 | Shen | ................... | H04L 41/0895 |
| 2020/0242170 | A1 * | 7/2020 | Pogrebezky | .......... | G06F 16/986 |
| 2020/0349564 | A1 * | 11/2020 | Padmanabhan | ..... | G06F 16/1824 |
| 2021/0119820 | A1 * | 4/2021 | Matatyaou | .......... | H04L 12/2801 |
| 2023/0353916 | A1 * | 11/2023 | Matatyaou | .......... | G06F 9/45541 |

FOREIGN PATENT DOCUMENTS

| | | | | | |
|---|---|---|---|---|---|
| CN | | 108809672 A | * | 11/2018 | ......... H04L 43/0817 |
| WO | WO-2018100437 A1 | * | 6/2018 | ........... H04L 41/122 |

OTHER PUBLICATIONS

R. Vilalta et al., "Network virtualization controller for abstraction and control of OpenFlow-enabled multi-tenant multi-technology transport networks," 2015 Optical Fiber Communications Conference and Exhibition (OFC), Los Angeles, CA, USA, 2015 (Year: 2015).*

* cited by examiner

| Hardware-based Challenges | Virtualization Opportunities |
|---|---|
| Unsustainable space, power and cooling | Dramatically reduced space, power and cooling footprint |
| Proprietary and custom hardware, with long development cycles | More frequent and shorter development cycles |
| Complex and infrequent software upgradeability results in slow feature introduction | Agile development with frequent software upgrades delivers fast feature velocity |
| Limited capacity, scalability and flexibility | Sustainable capacity growth, elastic scalability and increased flexibility |
| Larger failure domain | Smaller failure domains |
| High operational expenditure (OpEx) | Improved Total Cost of Ownership (TCO), including reduced operational (OpEx) and capital expenditure (CapEx) |

FIG. 2

| Old Way | New Way |
|---|---|
| Application runs on custom hardware | Application runs on COTS hardware |
| Application is implemented partially or fully on hardware components (e.g. ASIC, FPGA) | Application is implemented in software |
| Replaced every three to five years | Long lifespan |
| Application is upgraded infrequently | Application is upgraded regularly |
| Equipment location is limited | Equipment location is varied |
| Services turned on are labor intensive | Services are turned on automatically with orchestration |
| Service monitoring is labor intensive | Service monitoring (telemetry) is performed by software analytics |
| Service events are limited to local hardware storage | Service events are stored in the cloud |

FIG. 3

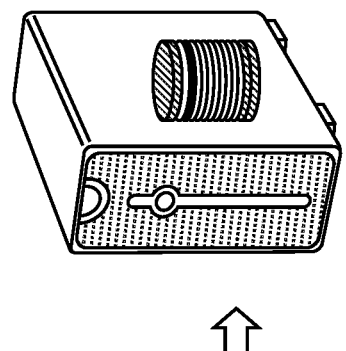
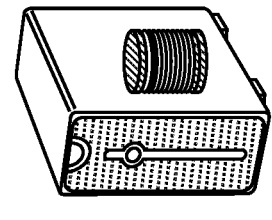
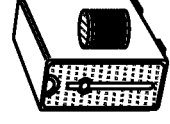
FIG. 4
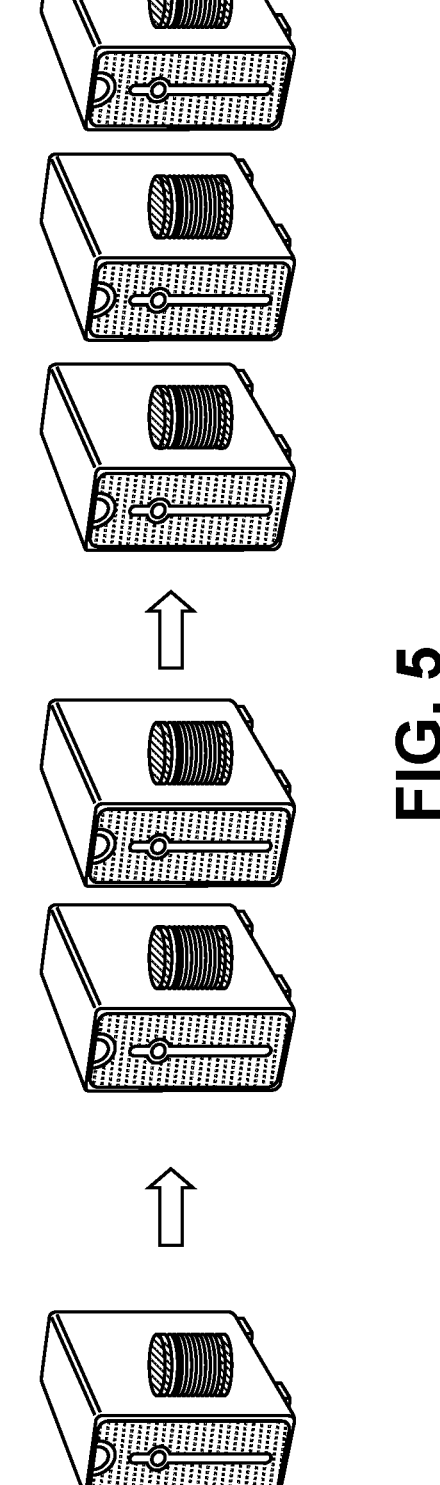
FIG. 5

VIRTUAL ACCESS HUB

CLAIM OF PRIORITY

The present application is a continuation-in-part of, and claims priority to, U.S. patent application Ser. No. 17/068, 349, U.S. Pat. No. 11,665,012, entitled "Virtual Access Hub," filed on Oct. 12, 2020, issued on May 30, 2023, the disclosure of which is hereby incorporated by reference for all purposes in its entirety as if fully set forth herein.

U.S. Pat. No. 11,665,012 is a continuation-in-part of, and claims priority to, U.S. patent application Ser. No. 16/054, 979, U.S. Pat. No. 10,802,856, entitled "Virtual Cable Hub," filed on Aug. 3, 2018, issued on Oct. 13, 2020, the disclosure of which is hereby incorporated by reference for all purposes in its entirety as if fully set forth herein.

U.S. Pat. No. 10,802,856 claims priority to U.S. Provisional Patent Application No. 62/544,550, entitled "Real-World Deployment of a Virtual Cable Hub," filed on Aug. 11, 2017, the disclosure of which is hereby incorporated by reference for all purposes in its entirety as if fully set forth herein.

FIELD OF THE INVENTION

Embodiments of the invention generally relate to various forms of access media such as a software-implemented Cable Model Termination System (CMTS), OLT, Ethernet Switch, and Cloud Radio Network equivalent.

BACKGROUND

Converged Cable Access Platform (CCAP) is a standard, proposed and administered by CableLabs of Louisville, Colorado, for an architecture employed by a cable operator. CCAP is a managed architecture which leverages existing cable technologies and makes provisions for new ones that may arise. As a result, cable operators may take many different paths towards conforming to the CCAP standard, and thereafter, may continue to evolve their architecture in many ways post-compliance to CCAP.

A Cable Modem Termination System (CMTS) refers to a piece of equipment, typically located at a cable company's headend, which is used to provide high speed data services to cable subscribers.

Broadband Network Gateway (BNG) is a standard, proposed and administered by the Broadband Forum (BBF) for an architecture employed by Telecommunications operators. The BNG architecture corresponds to a piece of equipment, typically located at a telecommunication company's Central Office (CO), which is used to provide Subscriber Management, Layer 3 Routing, Authentication & Authorization, and Operations Support for Digital Subscriber Line (DSL) and as Passive Optical Networks (PON) services. When use in combination with an Optical Line Terminal (OLT), the BNG provides the provides the higher protocol layer functions associated with Internet Protocol (IP) networking and subscriber service operations.

Optical Line Terminal (OLT) is a standard, proposed and administered by the International Telecommunications Union (ITU) and Institute of Electronics and Electrical Engineers. The OLT standard covers a piece of equipment, typically located in a telecommunications' operator CO or remote location, that provide high speed data services to PON subscribers. When used with a BNG, the OLT provides the lower protocol layer functions associated with Media Access Control (MAC) and Physical (PHY) layer connection to subscriber-side devices known as optical network terminals (ONT) or optical network units (ONU). ONTs and ONUs are both similar in function to DOCSIS Cable Modems.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 2 is a table of virtualization opportunities for a Cable Hub according to an embodiment of the invention;

FIG. 3 is a table of virtualization changes in the Cable Hub according to an embodiment of the invention;

FIG. 4 is an illustration of vertical scaling according to an embodiment of the invention;

FIG. 5 is an illustration of horizontal scaling according to an embodiment of the invention;

DETAILED DESCRIPTION OF THE INVENTION

Approaches for a multi-tenant application are presented herein. In the following description, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form or discussed at a high level to avoid unnecessarily obscuring teachings of embodiments of the invention.

According to the techniques discussed herein, different portions or components of an access network are virtualized. Virtualization may be carried out in different fashions based on functional needs, e.g., the use of cloud technologies may be relied upon for performing telemetry and monitoring, configuration and orchestration, operations and back-office elements, while the use of software-based CCAP solution, containerization approaches, and virtual machines (VM)

may be relied upon for different applications and services. In addition to operational considerations, support for maintaining legacy service, such as traditional broadcast video, Video on Demand (VOD) and out-of-band (OOB), as well as support for existing and future IP services, will be considered in the transition to a virtual cable hub. While embodiments will be described with reference to a vCMTS as an example of a multi-tenant application, other embodiments will be discussed below in relation to other technical contexts, including but not limited to Broadband Network Gateway (BNG) and Optical Line Terminal (OLT). Embodiments may be used to support additional forms of access media such as Passive Optical Networks (PON), Ethernet, and future wireless media.

Embodiments may employ virtualization to enable change at a pace which meets or exceeds customer demand in the most effective manner. Change can be defined in many ways, such as new services, additional security, elastic storage, more efficient infrastructure and importantly for the cable broadband industry, enhanced speed. Embodiments may employ virtualization by separating applications or software from hardware. Key benefits for doing so are scalability, sustainability and elastic deployment with the quickness and agility needed to increase business efficiencies and productivity. This separation of software and hardware is the key to quickness and agility of change, as the software can be changed while running on deployed hardware. Upgrading software is not only quicker than replacing hardware, but requires less operational expenditure (OpEx), such as onsite labor and increase in power consumption requirements.

Cable Hubs

Figure 1:
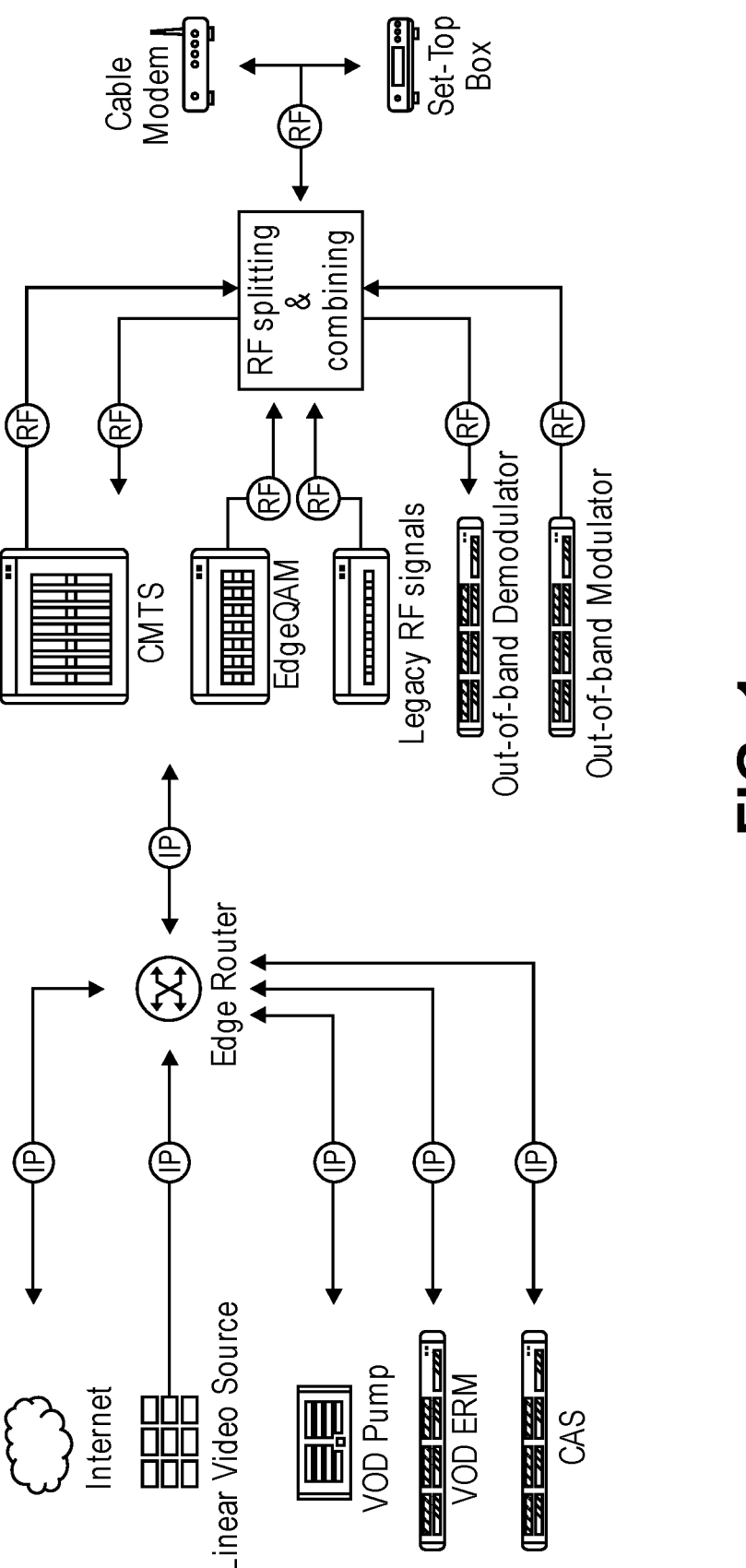
FIG. 1 is an illustration of Cable Hub in which an embodiment of the invention may be deployed.

FIG. 1 is an illustration of Cable Hub in which an embodiment of the invention may be deployed. Today's cable hub is a combination of many legacy and purpose-built hardware-based solutions, which over the past 20 years (DOCSIS turned 20 years in March 2017) has delivered on data, voice, and legacy (MPEG-based) video services. To deliver these fundamental services (other services, such as home security and commercial services, are typically running over the DOCSIS data service as the fundamental service), active equipment found in a typical cable hub includes Cable Modem Termination Systems (CMTS), EdgeQAMs, Routers and switches, Out-of-band modulators and return path demodulators, FCC and LTE leakage signal generation, Provisioning servers (such as DHCP and TFTP), Configuration tools, and Monitoring tools.

Most of the equipment listed above can be categorized as either custom hardware (such as BNG, OLT, Carrier Ethernet Switches, CMTS, and EdgeQAM) or custom software (e.g., configuration and management tools) and most are purpose-built for the cable edge (with the exception of routers, switches and some of the provisioning server components). The challenges in continuing with a customized cable edge and hardware-based approach as compared to a virtualization approach are shown in FIG. 2.

Presently, cable hubs are most challenged by equipment which does not sustainably scale physically or operationally with service or capacity growth. Sustainable growth will happen when the performance and scale meet or exceeds consumer consumption demands, either driven by actual usage or competition from other access providers, such as Fiber To The Home (FTTH). In other words, virtualizing the cable hub is a high-tech solution for a low-tech problem, specifically, running out of facility space, as well as ever-increasing and recurring electricity expenses.

Another consideration for the ever-evolving cable hub is Remote PHY. While this standard technology enables virtualization in many ways, it also demands many more nodes (or service groups) being deployed, with some estimates exceeding a ten-fold increase in nodes. Today's Cable Hub deployment is manual and labor intensive and does not scale operationally, especially when considering the desired deployment rate of Remote PHY nodes. Today's cable hub tools include tried-and-true and familiar tools such as Command Line Interface (CLI), Simple Network Management Protocol (SNMP) and Internet Protocol Detail Record (IPDR). In many cases, individual cable operators have customized home-grown tools, interfacing to hardware-based equipment over standard protocols (SNMP, IPDR) or proprietary CLI. These configuration and management interfaces are also archaic, slow, and manual in many cases.

The equipment and tools which benefit the most when transitioning to a sustainable growth deployment model will be highlighted as components in the cable hub which have been virtualized in a real-world deployment of a virtual cable hub.

When looking at how virtualization applies to the cable edge space, particularly in the cable hub, equipment and tools that are custom hardware-based or benefit from orchestration (for the purpose of eliminating labor intensive human interaction to operate and manage services) will be considered. To be specific, there is a disruptive change coming to cable hubs, as described in FIG. 3.

Virtual Cable Hubs

Virtualization in a virtual cable hub involves running virtual applications (for example, DOCSIS, video, OOB) on commercial off-the-shelf (COTS) x86 platforms (hardware compatible with the x86 instruction set architecture), which can be located in cable hubs, more centrally in fewer locations (such as data centers) or even in smaller form factors in distributed locations (such as street cabinets).

In this virtual cable hub, telemetry and logging tools perform analysis of streaming data predicting potential impactful events or visualizing historical events in a holistic fashion. In many ways, the idiom "a picture is worth a thousand words" becomes reality. Instead of hours of labor-intensive human scrutiny, which may result in a partial analysis and slower resolution of a field issue, a glance of dashboard provides an instantly clear picture showcasing visualized streaming data. The benefit is speed and accuracy in determining a more complete resolution.

Defining cable edge virtualization as running cable-specific virtual applications in software is a first step in the right direction. This identifies what elements or equipment will be virtualized. However, other virtualization concepts are important to consider, specifically how the software is virtualized. Other concepts to consider include containerization, virtual machines, and bare metal approaches. Some of these methods are mutually exclusive, while others are complementary or even dependent on each other. The following definitions are employed herein:

Bare metal: an application is executing on the native operating system (OS), in comparison to executing on a virtual machine or a virtual OS layer. In other words, the application can access "the metal" directly or via a native OS.

Virtual machine: System virtual machines are capable of virtualizing a full set of hardware resources, including one or more processors, memory, storage resources, and peripheral devices. A virtual machine monitor (VMM, also called a hypervisor) is the piece of software that provides the abstraction of a virtual machine.

Virtual appliance: a pre-integrated, self-contained system that is made by combining a software application (e.g., server software) with just enough operating system for it to run optimally on industry standard hardware or a virtual machine (e.g., VMWare, VirtualBox, Xen HVM, KVM).

Containerization: applications can be broken up into manageable, functional components, packaged individually with their dependencies, and deployed on irregular architecture easily.

Docker: a set of tools to package and deploy containers, which can specify container constraints and access permissions. Additionally, Docker sets up and deploys the container in Linux.

Cloud native: cloud native computing uses software to be containerized, dynamically orchestrated, and microservices oriented.

Sandboxing: an isolated computing environment for running applications.

Single-tenant: a single instance of a single application type running a single physical hardware platform.

Multi-tenant: multiple instances of a one or more application types running on one or more physical hardware platforms.

Kubernetes: an open-source system for automating deployment, scaling, and management of containerized applications.

Kubernetes-native application: an application which is designed or intended to be deployed or managed by Kubernetes.

Microservice: refers to an architectural approach that independent teams use to prioritize the continuous delivery of single-purpose services.

The microservices model is the opposite of traditional monolithic software which consists of tightly integrated modules that ship infrequently and have to scale as a single unit.

Criteria for deciding between the various virtualization approaches include the Time to Market (TTM), Performance, Scale of deployment, and Application Flexibility. Time to market (TTM) refers to the time criticality to deliver a minimum feature set of a virtualized set of applications. Over time, the feature set will grow with periodic software upgrades to the virtual applications.

Performance criteria consider the minimum application processing required to deliver a cost-effective footprint of COTS x86 servers. Performance will improve with periodic software upgrades to the virtual applications and the performance per rack unit will increase or the number of rack units will diminish to deliver the same performance.

The Scale of deployment criteria considers the minimum quantity of consumers supported by a virtual cable hub. The scale of deployment per rack unit will increase or the number of rack units will diminish to support the same quantity of consumers.

The application flexibility criteria consider the minimum set of application types and elasticity to execute different instances of different applications on a single physical server. The ability to execute many and different instances of different application types on a variable set of physical servers will be possible with periodic software upgrades.

The common theme for all four criteria (TTM, performance, scale, and application flexibility) is that there is a minimum or "good enough" starting point and that future software upgrades improve the virtual cable hub capabilities in different dimensions.

Embodiments of the invention may be used to provide high speed data services to subscriber devices. Such high-speed data services may comprise network access, cable network access, access to digital audio and/or video information, as well as other value added or complemental services. For example, the high-speed data services provided using an embodiment of an invention may include Dynamic Host Configuration Protocol (DHCP) services, software upgrade services, and Profile Management Application (PMA) services. When virtualizing a cable hub, virtual machines (VMs) may, but need not, be used.

Single Versus Multi-Tenant

Various approaches for virtualizing a cable hub include (a) a single-tenant application running on bare metal or a virtual machine, (b) a multi-tenant containerized application instances packaged and deployed by Docker on bare metal or virtual machine, and (c) a multi-tenant containerized application instances packaged and deployed by a commercial cloud server provider.

The most complex and performance-intensive application in a virtual cable hub is the virtual CMTS (vCMTS) component. As defined by the CableLabs Remote PHY standard, the DOCSIS physical layer is separated from all the upper layers, via the standards-based protocols Remote Downstream External PHY Interface Specification (DEPI), Remote Upstream External PHY Interface Specification (UEPI), and Generic Control Plane Specification (GCP). When referring to the vCMTS component in the context of virtualization, the CMTS Core functionality (as defined in the CableLabs Remote PHY standards) is implemented as a virtual application.

An incremental approach that may be employed by embodiments when virtualizing the cable hub is a crawl, walk, run, and then fly approach. With a virtualized approach rooted in software, maturing from crawling to flying is entirely performed by software upgrades along the way, and the penalty of tripping over oneself is limited to a software release iteration with no need to replace hardware.

The term "virtual access node" is used herein to refer to a vCMTS as well as a software-implemented BNG (or vBNG), a software-implemented OLT (or vOLT), and the like. In this sense, a virtual application is an application (such as CMTS, BNG, or OLT) that, while traditionally implemented on specialized hardware, is nevertheless implemented purely in software that executes upon general purpose (i.e., non-specialized) hardware, such as a commercial off-the-shelf computer (COTS).

One metric of virtual access node's performance is the packet processing rate, which in turn results in the bandwidth or throughput capabilities of a virtual access node. Meeting real-world performance requirements dictates that a single tenant virtual access node application running on bare metal has the quickest TTM, while still delivering on many virtualization benefits. Effectively, this is a virtual appliance approach, which can grow and scale accordingly by adding more servers, each running a single instance of a virtual access node application. Concluding quickly on whether the simplest virtualization approach meets the performance and scale requirements to deliver on the stated benefits of virtualization while meeting or exceeding functional requirements of traditional hardware-based access node approach is vital.

In practice, running a single instance of a virtual access node on x86 COTS servers delivers tens of Gbps of packet processing performance per x86 server rack unit to dozens of service groups, while reducing the space, power and cooling footprint by up to 90% relative to existing hardware-based integrated virtual access nodes.

The result of this first phase of a virtual cable hub is already delivering substantial capital and operating expenditure benefits to cable operators and can be debated whether the benefits already justify stating that this approach is "running."

Continuing with the crawl, walk, run, and fly analogy, let us shift gears and consider how fast a virtual cable hub can fly. The next set of critical benefits to a cable operator when looking at a cable hub are still covered by the four criteria (TTM, performance, scale, and application flexibility): (a) TTM: the speed to turn on consumer services to a single set of consumers, (b) Performance: improving uptime by limiting the scope of service outages, (c) Scale: the quantity of consumers which can be supported in a given footprint, and (d) Application flexibility: the set of virtual applications which are required for a virtual cable hub.

The approach of multi-tenant containerized application instances packaged and deployed by Docker on bare metal or a cloud-based provider provides many of these benefits.

Kubernetes provides the orchestration to deploy pods (a group of one or more containers), in conjunction with Docker as the tool to package the pods. "A pod models an application-specific 'logical host'—it contains one or more application containers which are relatively tightly coupled— in a pre-container world, they would have executed on the same physical or virtual machine. While Kubernetes supports more container runtimes than just Docker, Docker is a commonly known runtime, and it helps to describe pods in Docker terms. Pods serve as unit of deployment, horizontal scaling, and replication.

The speed to turn on consumer services is increased significantly when using a combination of Kubernetes and a Docker approach to deploying pods. This speed increase is gained when shifting from a human interaction to configure manually each unit of consumer deployment to an orchestrated and automated process. Additionally, reliability increases as the more error-prone manual method of configuring new consumer services is reduced or eliminated.

Improving uptime is a function of reducing failure domain size, which is a major benefit of a containerized approach. Determining the failure domain size of each pod or container provides the knob when determining the tradeoff between potentially more shared resources in a single pod (increasing CPU utilization percentage) and limiting the pod to a single consumer group, such as a service group. Software failures in some capacity are inevitable and uptime is improved as failure domains are reduced. By any measure, the performance metrics of uptime percentage and the number of service calls received over time is tracked by cable operators.

Containerization also has the benefit of horizontal scaling (i.e., "scale-out") in comparison to vertical scaling (i.e., "scale-up"). Vertical scaling increases a single application instance's set of specifications, such as bandwidth or subscriber count, by increasing the number of x86 CPU cores, storage, or NIC speed. A virtual cable hub uses vertical scaling to grow capacity when a single application instance can do more. Horizontal scaling increases a virtual cable hub's scale with a virtual set of application instances (pods), each with a specific and purposefully bounded scale specification. When the limitation of a single pod is reached, more pods are deployed.

FIG. 4 is an illustration of vertical scaling according to an embodiment of the invention, and FIG. 5 is an illustration of horizontal scaling according to an embodiment of the invention. The benefits of horizontal scaling through containerization are a smaller failure domain, it is simpler to develop, and it is simpler to test and more cost-effective COTS x86 server hardware requirements. Development and testing simplicity are realized by smaller data sets and test case parameters, such as developing to and testing to a scale of 200 as compared to 200,000 subscribers.

Lastly, multi-tenant in the context of a virtual cable hub, involves multiple instances of a single or multiple application types. Each pod of containers may be a different application type, and potential applications include CMTS Core, Out-of-band Core, Video Core, proactive network maintenance (PNM), orchestration and telemetry. Over time, different and new applications will be considered for virtualization. The benefit is leveraging the same COTS x86 servers for different application types, which delivers improved sparing (for hardware failures and replacement) and economy of scale benefits when procuring many of the same platform. When different applications are able to execute on the same COTS x86 server, dynamic and elastic utilization of CPU resources can be determined, during run-time, based on usage metrics and analytics to shift resources from lightly loaded applications to applications running hot.

Further Examples of Multi-Tenant Embodiments

Other embodiments may support a software based CMTS, such as CableOS® by Harmonic, Inc. of San Jose, California, that is integrated with a Broadband Network Gateway (BNG) and/or an Optical Line Terminal (OLT). The BNG may provide services such as Subscriber Management, Layer 3 Routing, Authentication & Authorization, and Operations Support for Digital Subscriber Line (DSL), and as Passive Optical Networks (PON) services. When used in combination with an OLT or DSLAM, the BNG may provide the higher protocol layer functions associated with Internet Protocol (IP) networking and subscriber service operations. When used with a BNG, the OLT provides the lower protocol layer functions associated with Media Access Control (MAC) and Physical (PHY) layer connection to subscriber-side devices known as optical network terminals (ONT) or optical network units (ONU), which are both similar in function to DOCSIS Cable Modems.

Figure 8:
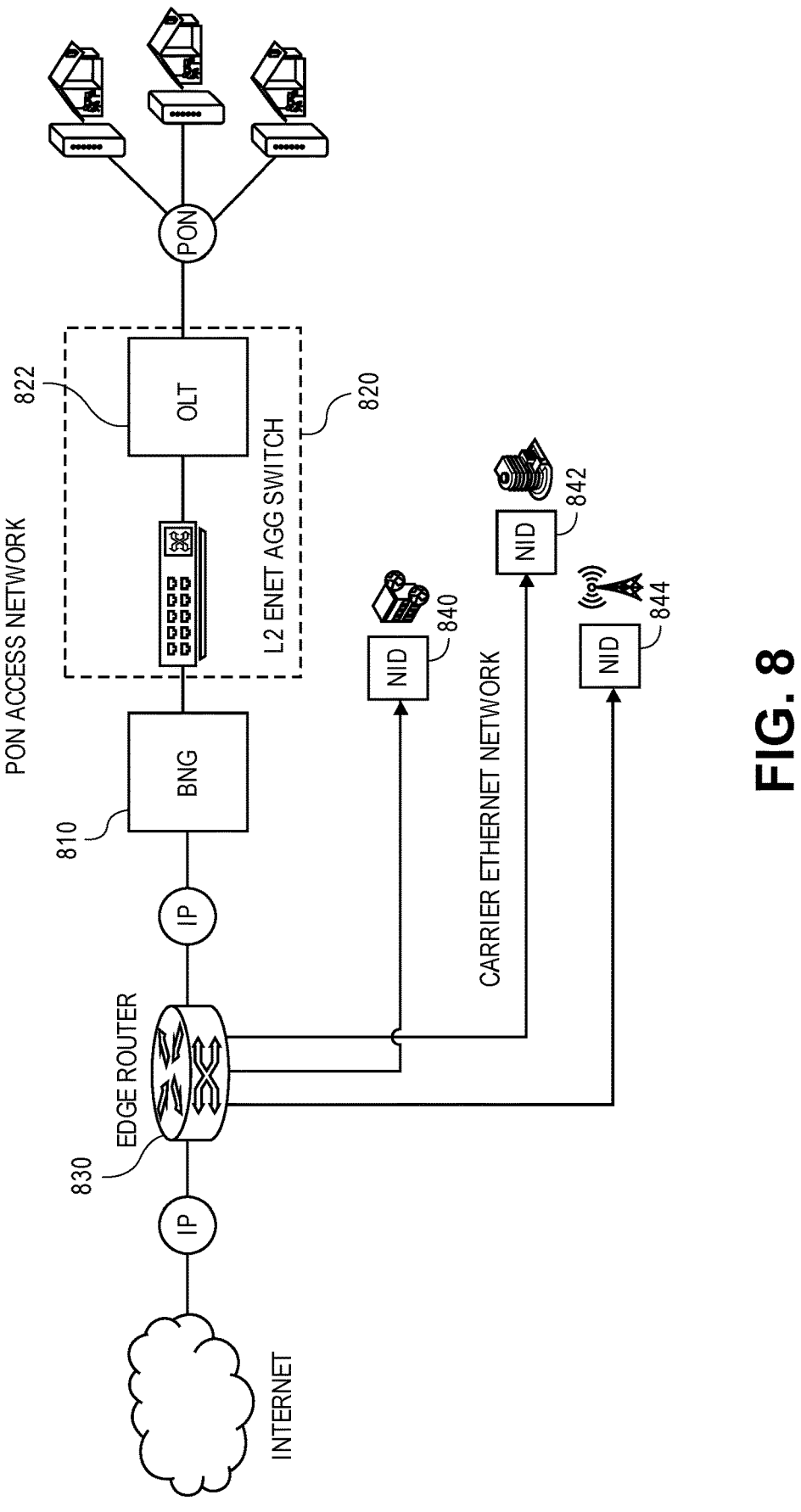
FIG. 8 is an illustration of a PON Access and a Carrier Ethernet Network in which an embodiment of the invention may be deployed.

FIG. 8 is an illustration of a PON Access or Carrier Ethernet Central Office in which an embodiment of the invention may be deployed. FIG. 8 is an illustration of a Broadband Forum (BBF) based PON Access network and a Carrier Ethernet Network upon which an embodiment of the invention may be deployed in accordance with an embodiment. FIG. 8 depicts two different network types, the first being BBF PON (BNG+OLT) and the second being Carrier Ethernet. The Carrier Ethernet Network is the connection between the Edge Router and end-points in the fields, such as Enterprise Business customers 840, Government/Academic subscribers 842, and Mobile Radio towers 844.

FIG. 8 depicts a Broadband Network Gateway (BNG) 810, an optional Layer 2 Ethernet aggregation switch 820, an optical line terminal (OLT) 822, and edge router 830. In certain embodiments, aggregation switch 820 may be incorporated within an OLT network element (not shown in FIG. 8).

BNG 810 is a network & session layer network element that may correspond to a Layer 3 networking element that provides authentication, authorization, Subscriber Management & QoS, and per-Access Port & Subscriber traffic management to a Layer 2 Access Node. In a PON architecture, the access node is Optical Line Terminal (OLT) 822. BNG 810 may encapsulate Layer 3 subscriber traffic into Layer 2 VLANs that identify the OLT network element, the PON port, the ONU/ONT, and a subscriber service flow.

Optical Line Terminal (OLT) 822 is a MAC and PHY layer network element that translates VLAN encapsulation between itself and BNG 810 and the PON media using the Interworking Function (IWF). OLT 822 is responsible for upstream media access control (MAC) using a dynamic bandwidth allocation (DBA) and rate shaping on the downstream based on IWF provisioning of subscriber services. While only one OLT 822 and one edge router 830 is depicted in FIG. 8, a BNG 810 of an embodiment will typically service a plurality of OLTs 822 and a plurality of edge routers 830 will also typically be employed.

Both BNG 810 and OLT 822 network elements include some subset of FCAPS capabilities with BNG 810 being responsible for the authorization and subscriber access. FCAPS capabilities comprise fault operations, configuration operations, accounting operations, performance operations, and security operations. Each OLT 822 is typically responsible for encryption of individual subscriber traffic on the PON.

BNG 810 and OLT 822 are each typically custom hardware and software network elements that are purpose built for the PON standard supported (e.g., ITU and IEEE PON have several versions that support a variety of symmetric and asymmetric line speeds) and location of the operators network that it resides (e.g., Hub or Central Office, remote outdoor cabinet, strand-mount, or remote wiring closet). Configuration and provisioning of per-subscriber services must match between BNG 810 and OLT 822 to achieve the desired service model sold to the end user.

According to the techniques discussed herein, different aspects of the BNG 810 and OLT 822 are evaluated for virtualization, including the use of cloud technologies for orchestration of containerized micro-services for FCAPS, OLT Control, Networking, and User Plane operations. Logical functions performed by BNG 810 which may be virtualized include FCAPS, Networking, and User Plane operations for access services provided to subscribers connected on the PON to an OLT. Logical functions performed by OLT 822 which may be virtualized include FCAPS, OLT Control, MAC, and Physical layer connectivity to subscribers on the PON.

In contrast to the BBF access model, the CMTS, described in other sections of this document, is an integrated network & session as well as MAC and PHY layer network element. The CMTS collapses the two to three box solution typically used for PON into a single network element for DOCSIS access.

Figure 9:
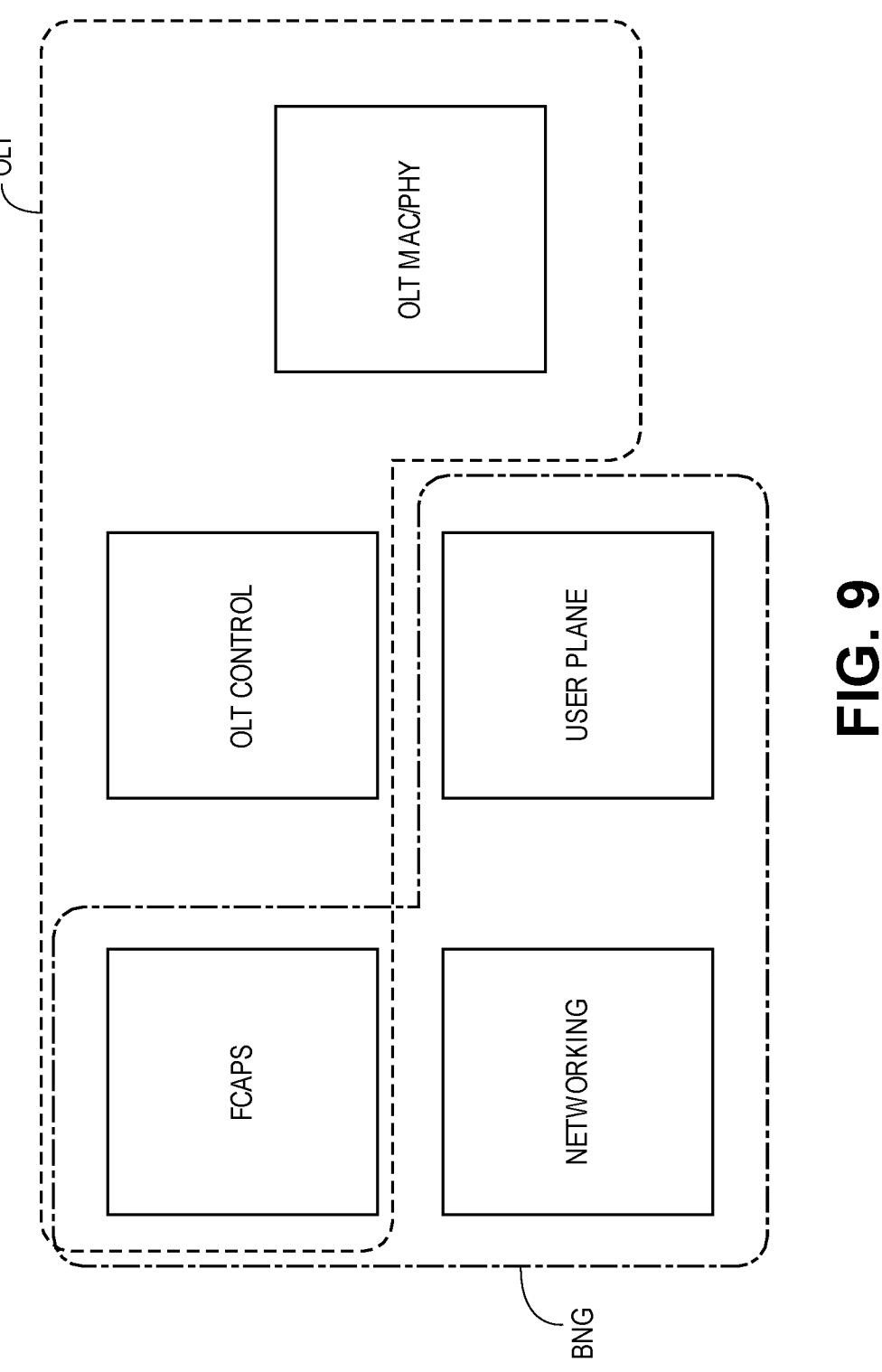
FIG. 9 represents the logical functions performed by BNG and OLT network elements according to an embodiment of the invention.

FIG. 9 represents the logical functions performed by BNG and OLT network elements according to an embodiment of the invention. The BNG network element performs some FCAPS operations, Networking operations, and User Plane operations for access services provided to subscribers connected on the PON to the OLT. The OLT network element performs some FCAPS operations, OLT Control operations, MAC operations, and provides Physical layer connectivity to subscribers on the PON.

Figure 10:
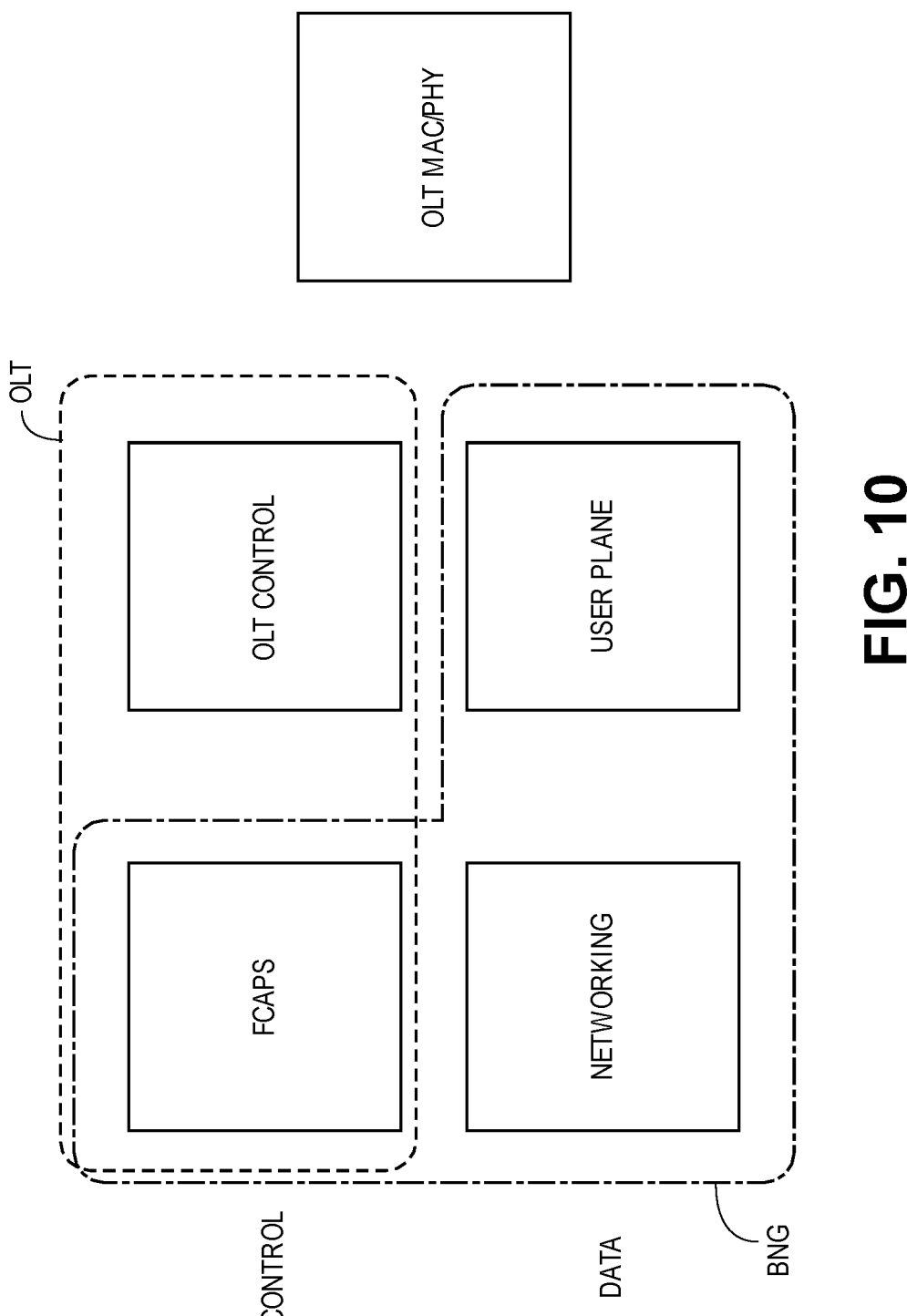
FIG. 10 represents various embodiments of the invention in which virtual network functions for control and data operations are defined for OLT Control and BNG functions.

FIG. 10 represents various embodiments of the invention in which virtual network functions for control and data operations are defined for OLT Control and BNG functions. The virtual OLT Control operates independent of the BNG and is responsible for interacting with physical OLT MAC/PHY network elements. The virtual OLT Control may interact with proprietary and standards based OLT network elements providing ITU and IEEE PON connectivity. The virtual OLT may interact with physical BNG and virtual BNG. The virtual BNG operates independent of the OLT Control and includes control, networking, and user plane operations. The virtual BNG may interact with physical OLT Control or virtual OLT Control. The virtual OLT and virtual BNG may also be collocated as tenant applications within the same orchestrated computing cluster.

PON Transport

Figure 11A:
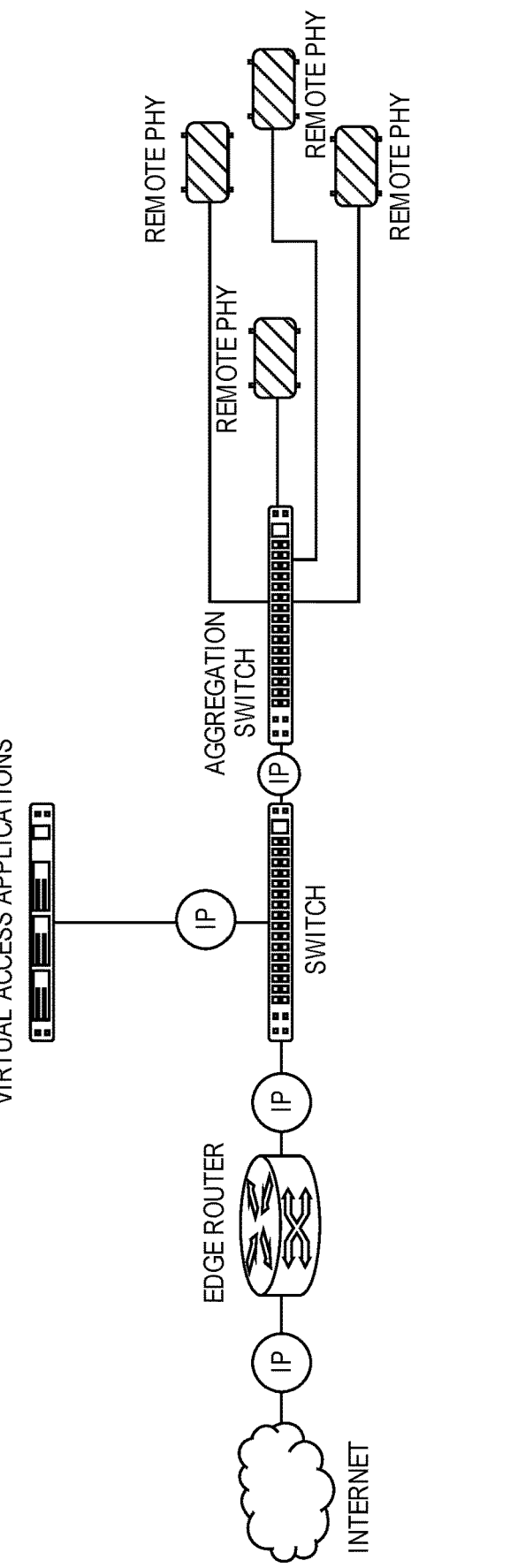
FIGS. 11A and 11B are two portions of a single illustration of a system employed by Cable operators deploying the Distributed Access Architecture for separating the PHY (or MAC/PHY) from the CMTS Core functions in accordance with an embodiment of the invention.
Figure 11B:
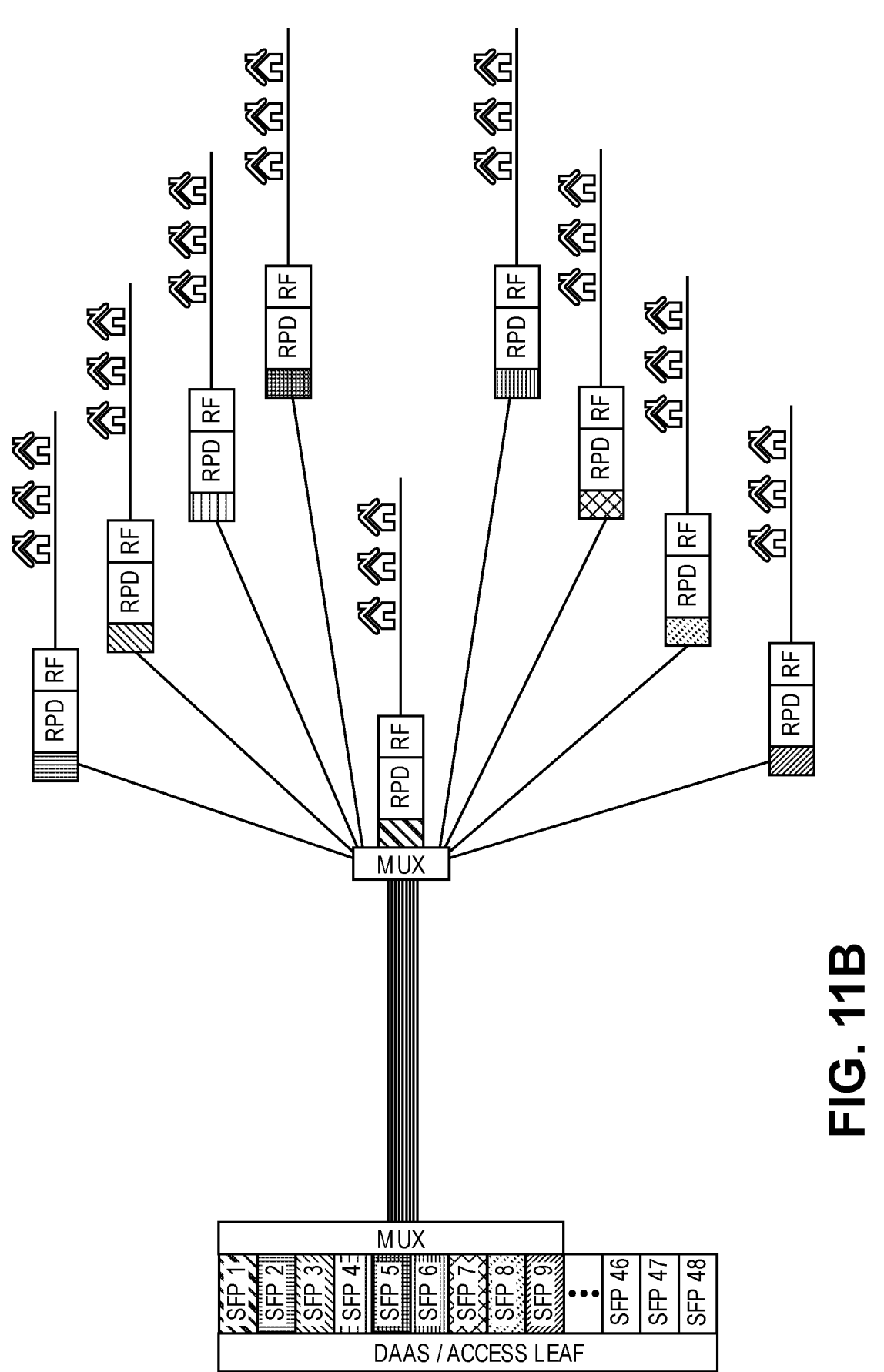

FIGS. 11A and 11B are two portions of a single illustration of a system employed by Cable operators deploying the Distributed Access Architecture (DAA) for separating the PHY (or MAC/PHY) from the CMTS Core functions in accordance with an embodiment of the invention. In this embodiment, the virtualized CMTS is used as an example of the CMTS Core. DAA relies on digital ethernet optics that employ expensive Wavelength Division Multiplexing (WDM) optical transceivers between the Aggregation Switch in the Hub (sometimes referred to as the Distributed Access Aggregation Switch, DAAS) and Remote Nodes in the outside plant (the remote nodes include an RPD or RMD).

Figure 12A:
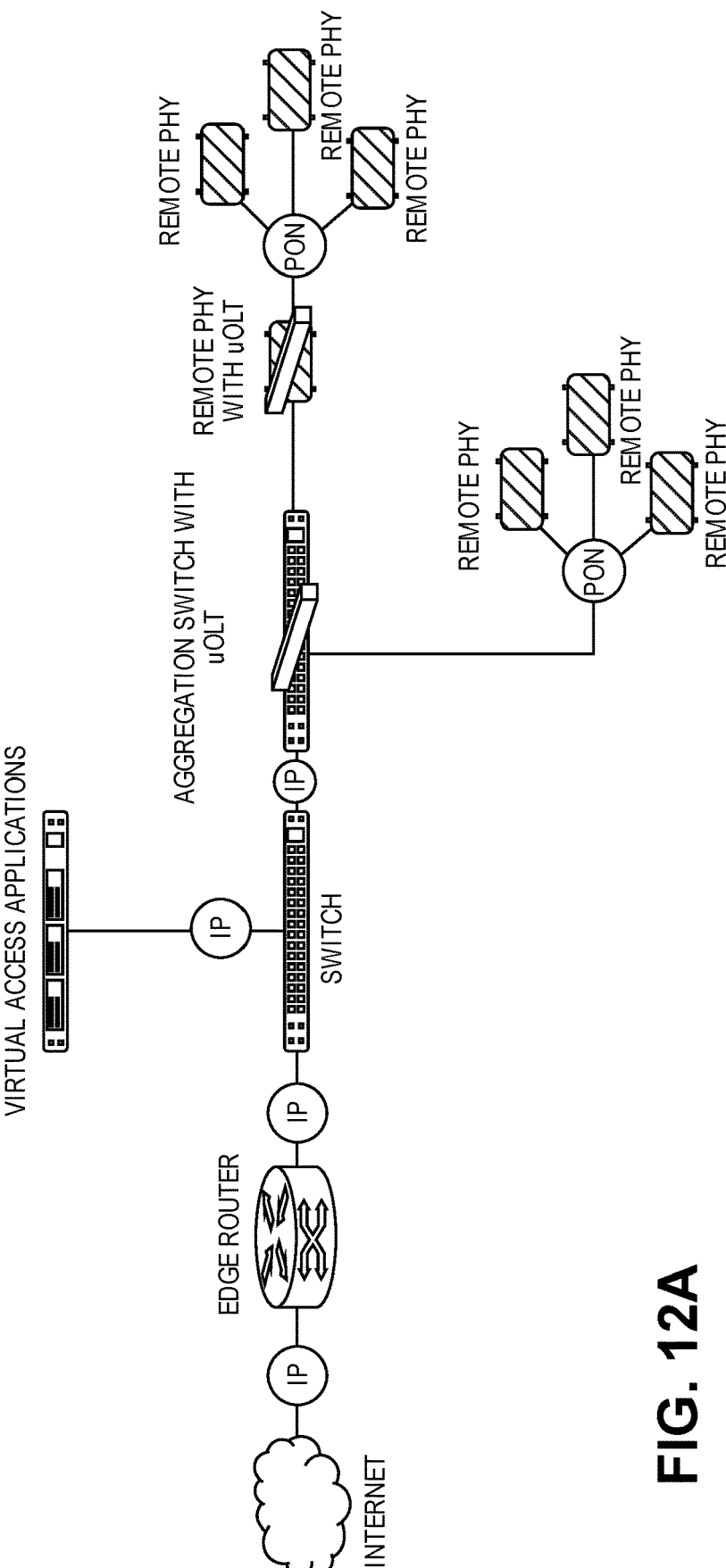
FIGS. 12A and 12B are two portions of a single illustration of a system employing aggregation in the outside plant to sub-tend multiple nodes (RPD and/or RMD) using the point-to-multipoint nature of PON as a transport service in accordance with an embodiment of the invention.
Figure 12B:
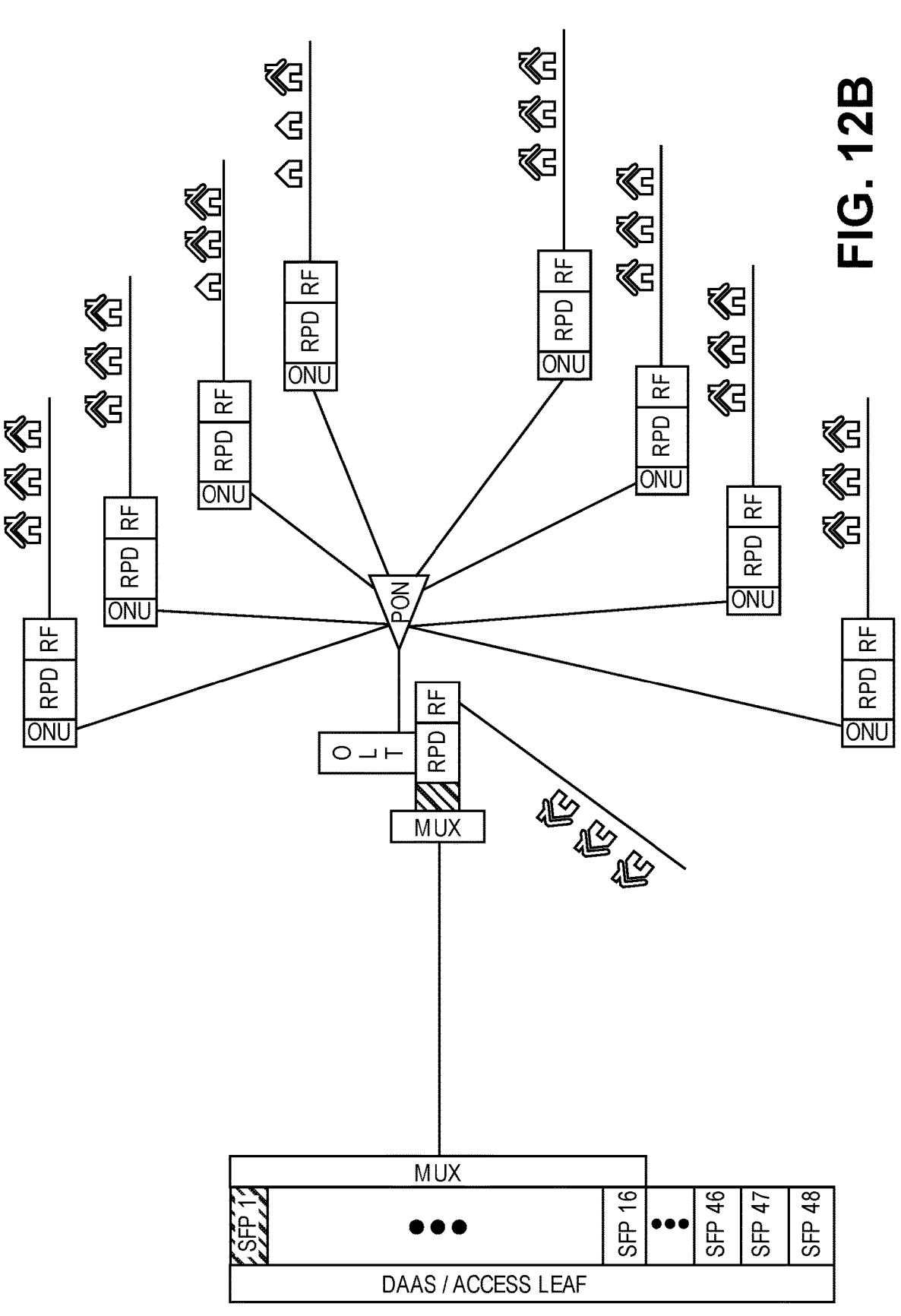

FIGS. 12A and 12B are two portions of a single illustration of a system employing aggregation in the outside plant to sub-tend multiple nodes (RPD and/or RMD) using the point-to-multipoint nature of PON as a transport service in accordance with an embodiment of the invention. In this embodiment, the first node in the network includes a pluggable OLT device that sub-tends additional nodes (RPD and/or RMD) that include a pluggable ONU device. This transport inter-connect dramatically lowers the complexity and cost of individual sets of WDM optics between each node and the DAAS by using a single point-to-point connection to the lead node that incorporates and OLT port that connects to remaining sub-tended nodes that include an ONU.

Microservices

The services provided by software executed by a single or multi-tenant application may also referred to as microservices. Shifting from hardware-based to software-based implementations, as well as shifting in software development methodology from waterfall to agile, results in dramatically improved feature velocity. Shifting from traditional monolithic software to a microservices approach is another lever which improves feature velocity and delivers more frequent and higher quality software upgrades.

Monolithic software is released as a single unit, and due to size and complexity, has more software defects as well as longer regression test cycle time. Microservices are lighter-weight modular units of software, which can be defined with a limited set of capabilities with published interfaces. With monolithic software, software must operate as a functional unit, which can lead to a single point of failure if any portion of the functional unit encounters an operational problem. With microservices, each upgraded service software can be tested with lighter-weight automation and shorter regression test cycle time.

A notable benefit is improved software upgradeability, in terms of total time and service outage potential. Microservices, by definition, have smaller code size than a single monolithic software image. This results in less time to download software images, less time to upgrade software to a limited set of one or more microservices and reducing the minimal amount of code changes when correcting defective software. When performing hitless or in-service-software-upgrades (ISSU), redundancy or protection mechanisms are typically employed to activate a protected unit of software while the originally active software unit is upgraded without impacting service. However, during this time, overall system protection is diminished. With microservices, the total amount of unprotected time during ISSU is reduced, improving overall high availability of the virtual cable hub.

Virtualized Multi-Tenant Containerized Applications

Figure 6:
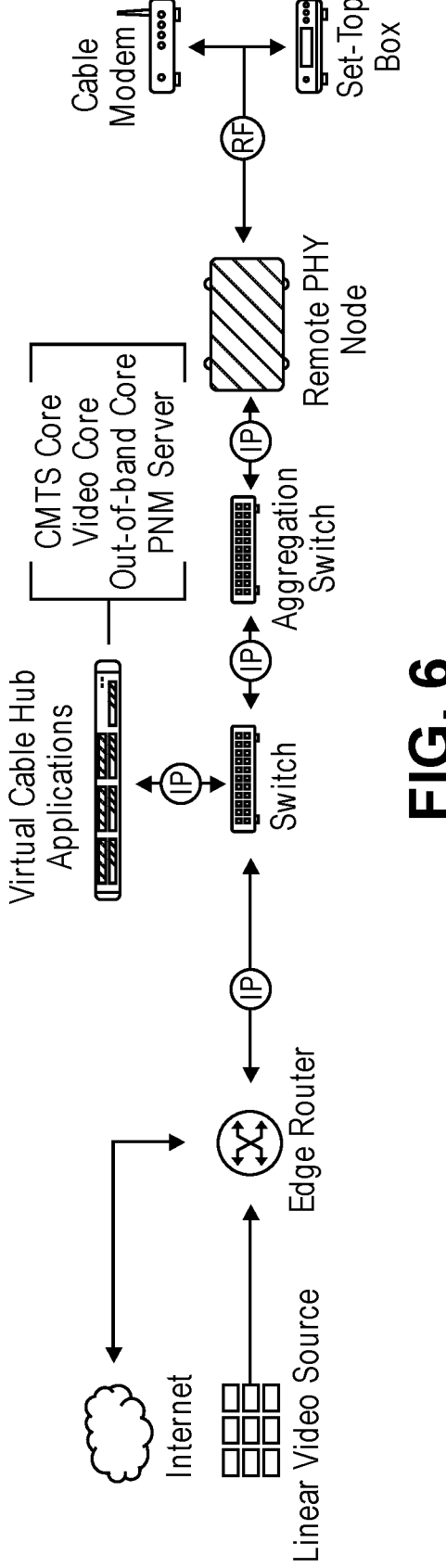
FIG. 6 is an illustration of a virtual cable hub according to an embodiment of the invention.

The CMTS and EdgeQAM, which are historically implemented in big-iron hardware-based chassis, as well as legacy RF signal and out-of-band signal generation performed in the cable hub are shown as example applications which are virtualized as multi-tenant containerized applications turned on with automated orchestration on COTS x86 servers (as shown in FIG. 6). In this future vision of a virtual cable hub, all data, video, and voice services for residential and business customers are IP-based.

The virtual cable hub depicted in FIG. 6 is a bit too idealistic as a starting point, with the noted legacy services of linear/broadcast MPEG video, video-on-demand (VOD), switched digital video (SDV), as well as out-of-band signaling for set-top box (STB) and legacy RF signal generation such as HMS and FM. With millions of legacy consumer devices at subscribers' homes, these legacy services will be reduced over many years, eventually being replaced by pure IP-based services. Until that moment, the virtual cable hub, deployed in a DAA architecture such as Remote PHY, will need to support IP transport of the RF signals at the virtual cable hub, with the IP transport converted and modulated to RF signals at the Remote PHY node.

Figure 7:
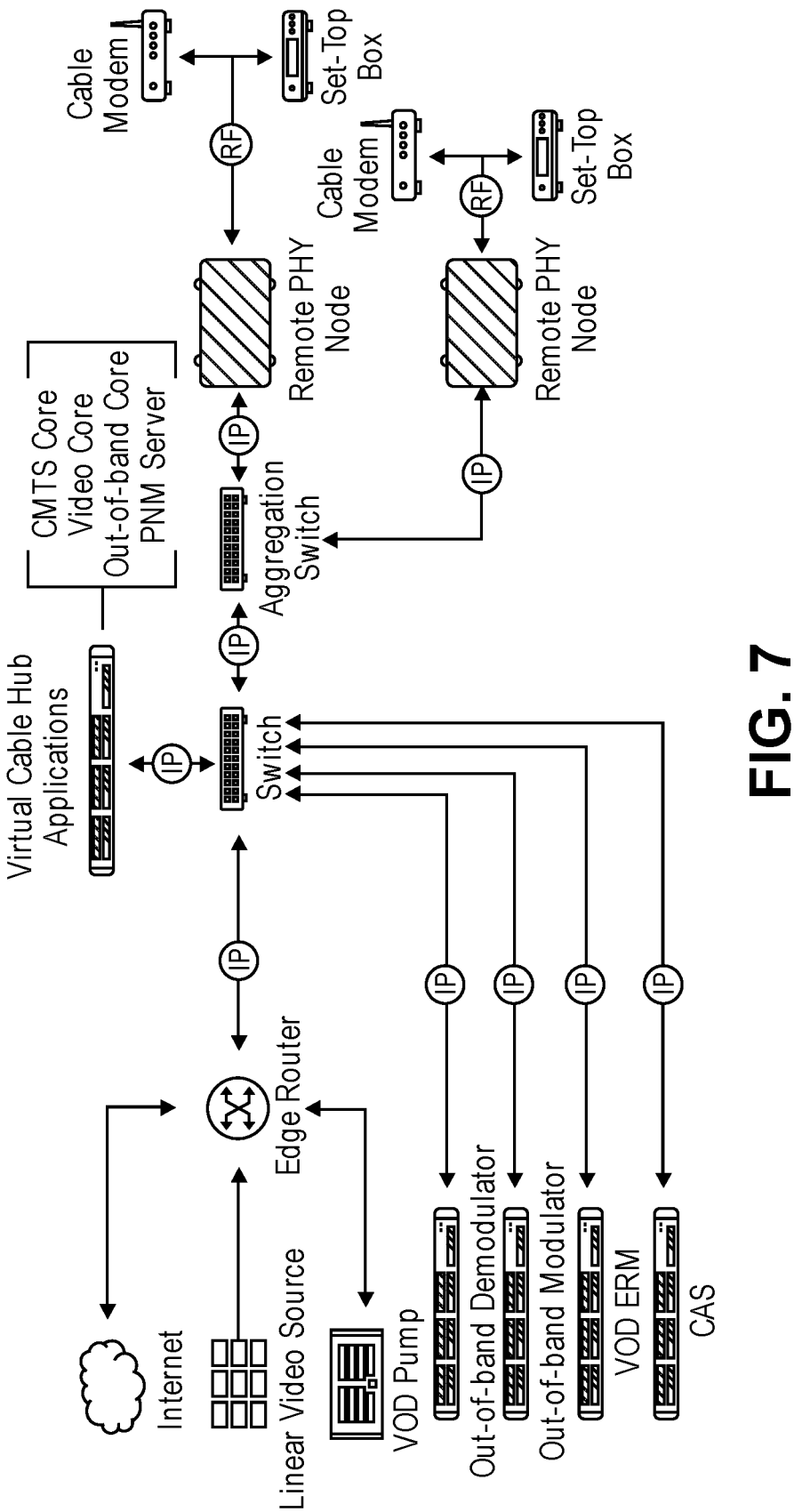
FIG. 7 is an illustration of a virtual cable hub in conjunction with legacy services according to an embodiment of the invention.

The applications to encapsulate the IP transport of the legacy RF signals do not require much processing and are scalable. With a virtual cable hub, instead of requiring single-purpose custom hardware-based solutions for each and every specialized legacy function, a virtual application can be deployed on available server resources in a cluster of servers to deliver the necessary capabilities. FIG. 7 shows a virtual cable hub with legacy services supported.

The virtual cable hub described in this paper may be considered "cloud native" as it meets the conditions defined: containerized, dynamically orchestrated and microservices oriented. However, "cloud native" can also refer to applications executing in the cloud (private/on-premises or public). An example of a public cloud service is Amazon Web Services (AWS), which claims "on-demand delivery of compute power, database storage, applications, and other IT resources through a cloud services platform."

The virtual cable hub is advancing quickly in real-world deployments and delivering a full set of services, meeting demanding performance requirements for speed, latency, and jitter. With vital residential and commercial services being delivered, if services might be hindered in a measurable way, the tradeoffs must be considered. Even in the early days of a virtual cable hub, some configuration and monitoring may be serviced in the cloud, public or private. In particular, logging, and monitoring is well suited for implementation in a cloud architecture, with on-demand increase in database storage, and easy accessibility to telemetry and analytics.

Consider the limitations of a traditional hardware-based solution, with finite on-board storage for a small service area. Once the storage is exhausted, the older data is replaced with fresh data, which leads to less samples of data being stored or a short time span of data analytics or logging. Additionally, correlating data is a labor-intensive activity, with a person logging into each platform remotely. In a virtual cable hub, a continuous stream of data is sent to the cloud, with machine analytics performed on a much larger service area. The cloud service expands, as necessary, to support longer time spans. Moreover, instead of data taken at a few instants in time, the data is nearly continuous and provides a complete picture of the virtual cable hub health.

The virtual cable hub will leverage the numerous and substantial virtualization benefits from other industries and apply these tried-and-true virtualization concepts for the first time. These concepts are the keys to unlocking the path to sustainably growing capacity, adapting quickly to customer demands, and a solution which is flexible and elastic enough to dynamically augment and shift resources to the most in-demand applications.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. One or more non-transitory computer readable storage mediums storing one or more sequences of instructions for a multi-tenant application, which when executed by one or more processors, cause:

said multi-tenant application providing high speed data services to one or more subscriber devices, wherein said multi-tenant application comprises:

one or more first servers that each perform packet switching and routing; and one or more second servers that each perform FCAPS functions for said one or more subscriber devices, wherein each of said one or more second servers are each implemented entirely within an application-specific logical host composed of one or more application containers, wherein said FCAPS functions comprise fault operations, configuration operations, accounting operations, performance operations, and security operations, and wherein said high speed data services comprise at least one or more of Dynamic Host Configuration Protocol (DHCP) services, software upgrade services, and Profile Management Application (PMA) services.

2. The one or more non-transitory computer readable storage mediums of claim 1, wherein multi-tenant application is executing as a software-based Broadband Network Gateway executing upon Commercial Off-the-Shelf (COTS) hardware, and wherein said one or more second servers each further perform network functions and user plane functions for said one or more subscriber devices.

3. The one or more non-transitory computer readable storage mediums of claim 1, wherein multi-tenant application is executing as a software-based Optical Line Terminal (OLT) executing upon Commercial Off-the-Shelf (COTS) hardware, and wherein said one or more second servers each further perform OLT control functions and OLT MAC/PHY functions for said one or more subscriber devices.

4. A method for executing a multi-tenant application, comprising:

executing said multi-tenant application to provide high speed data services to one or more subscriber devices by:

executing one or more first servers that each perform packet switching and routing for said one or more subscriber devices, and one or more second servers that each perform FCAPS functions for said one or more subscriber devices, wherein each of said one or more second servers are each implemented entirely within an application-specific logical host composed of one or more application containers, wherein said FCAPS functions comprise fault operations, configuration operations, accounting operations, performance operations, and security operations, and wherein said high speed data services comprise at least one or more of Dynamic Host Configuration Protocol (DHCP) services, software upgrade services, and Profile Management Application (PMA) services.

5. The method of claim 4, wherein multi-tenant application is executing as a software-based Broadband Network Gateway executing upon Commercial Off-the-Shelf (COTS) hardware, and wherein said one or more second servers each further perform network functions and user plane functions for said one or more subscriber devices.

6. The method of claim 4, wherein multi-tenant application is executing as a software-based Optical Line Terminal (OLT) executing upon Commercial Off-the-Shelf (COTS) hardware, and wherein said one or more second servers each further perform OLT control functions and OLT MAC/PHY functions for said one or more subscriber devices.

7. A system for a multi-tenant application, comprising:

one or more processors; and one or more non-transitory computer-readable storage mediums storing one or more sequences of instructions, which when executed, cause:

said multi-tenant application providing high speed data services to one or more subscriber devices, wherein said multi-tenant application comprises:

one or more first servers that each perform packet switching and routing; and one or more second servers that each perform FCAPS functions for said one or more subscriber devices, wherein each of said one or more second servers are each implemented entirely within an application-specific logical host composed of one or more application containers, wherein said FCAPS functions comprise fault operations, configuration operations, accounting operations, performance operations, and security operations, and wherein said high speed data services comprise at least one or more of Dynamic Host Configuration Protocol (DHCP) services, software upgrade services, and Profile Management Application (PMA) services.

8. The system of claim 7, wherein multi-tenant application is executing as a software-based Broadband Network Gateway executing upon Commercial Off-the-Shelf (COTS) hardware, and wherein said one or more second servers each further perform network functions and user plane functions for said one or more subscriber devices.

9. The system of claim 7, wherein multi-tenant application is executing as a software-based Optical Line Terminal (OLT) executing upon Commercial Off-the-Shelf (COTS) hardware, and wherein said one or more second servers each further perform OLT control functions and OLT MAC/PHY functions for said one or more subscriber devices.

* * * * *